United States Patent [19]
Hirata et al.

[11] 3,942,261
[45] Mar. 9, 1976

[54] METHOD FOR PRODUCING POWDER PAINT

[75] Inventors: Isamu Hirata; Makoto Nishino; Kazuhide Saigo, all of Tokyo, Japan

[73] Assignee: Toyo Ink Manufacturing Co., Ltd., Tokyo, Japan

[22] Filed: Dec. 23, 1974

[21] Appl. No.: 535,907

[30] Foreign Application Priority Data

Dec. 21, 1973 Japan............................. 48-142416
May 14, 1974 Japan............................. 49-52826
June 18, 1974 Japan............................. 49-68743

[52] U.S. Cl. ........................................................ 34/5
[51] Int. Cl.² .............................................. F26B 5/06
[58] Field of Search .................................. 34/5, 92

[56] References Cited
UNITED STATES PATENTS

| | | | |
|---|---|---|---|
| 3,730,750 | 1/1973 | Fabian | 34/5 |
| 3,731,391 | 5/1973 | Schweizer | 34/5 |

*Primary Examiner*—John J. Camby
*Attorney, Agent, or Firm*—Sughrue, Rothwell, Mion, Zinn & Macpeak

[57] ABSTRACT

A method for producing a powder paint which comprises dissolving or dispersing the paint components in a liquid medium, freezing the resulting solution or liquid dispersion and subliming the liquid medium in a vacuum to obtain a powder paint.

7 Claims, No Drawings

METHOD FOR PRODUCING POWDER PAINT

BACKGROUND OF THE INVENTION

1. Field of the Invention

The present invention relates to a method for producing a powder paint, by which a powder paint which has superior properties compared to powder paints obtained by prior methods can be obtained and by which even paint components which are difficult to convert to a powder paint by prior methods can be made into an excellent powder paint.

2. Description of the Prior Art

A powder paint is applied to materials to be painted in the form of a powder and thereafter a coating is formed by heating. Heretofore, a powder paint has been prepared by mechanically grinding the paint components followed by mixing, by mixing the paint components followed by mechanical grinding, by melt-mixing the paint components followed by cooling and mechanical grinding or by mixing the paint components in the presence of a solvent followed by removal of the solvent and mechanical grinding.

In these methods where mechanical grinding is used an expensive apparatus is required for grinding; particles having a uniform particle size are difficult to obtain and homogeneous mixing is difficult to conduct in the powder mixing, which destroys the homogeneity required for the paint. Further, a paint composition containing reactive components is difficult to powder because heat is often applied in the mixing and grinding steps. Further, a paint which provides a metallic-luster and which contains a metal powder loses the metallic-luster in the grinding step and a good quality powder paint can not be obtained since a homogeneous mixing of the powder can not be achieved. In the method where the paint components are dissolved in a solvent and are spray-dried, a deterioration of the paint occurs due to heat and a complicated apparatus is required, which is not suitable for the production of a variety of products, even though no deterioration occurs due to ginding.

SUMMARY OF THE INVENTION

An object of the present invention is to remove the defects and difficulties associated with the prior methods as described above.

The present invention accordingly provides a method for producing a powder paint which comprises dissolving or dispersing the paint components in a liquid medium, freezing the resulting solution or liquid dispersion and removing the liquid medium by sublimation to obtain a dry powder paint.

DETAILED DESCRIPTION OF THE INVENTION

The powder paint obtained by the method of this invention has greatly improved properties and has characteristics which are not attained by the prior methods. Further, according to the present invention paint components which have been difficult to powder using the prior methods can be readily powdered. Additionally, according to the present invention the mixing of the components can be effected satisfactorily and homogeneously. Even components which tend to deteriorate or react due particularly to heat or friction such as aluminum powder or a polyol/isocyanate mixture can be prepared into a powder paint without loss of their original characteristics since high mechanical strength and heat are not applied. According to the present invention, even when grinding is required after drying, grinding is readily effected without particles which are too small resulting nor leaving particles which are too large. Thus, the distribution range of the resulting particles is narrow. This is an important feature of this invention, and the method of the present invention is suitable for the small scale production of a variety of products.

In the present invention, the paint components are dissolved or dispersed in a single liquid medium or a mixture of liquid media at a normal or slightly elevated temperature, e.g., about 20° to 100°C, and the paint components are mixed in the liquid medium. After cooling, the solution or liquid dispersion is frozen and the liquid medium is removed by sublimation to obtain a dry product; or the solution or liquid dispersion is sprayed in a freezing zone and dried by vacuum to obtain a dry product. The dry product obtained in this way, is a fine powder or porous mass. Accordingly, grinding can be effected readily, if necessary, without using any particularly strong or complicated grinding means. The particles of the powder are very small and the distribution range of the particle size is very narrow, and the yield of particles having a particle size ranging from about 20 to 70 $\mu$ which are suitable as a powder paint is higher.

Another feature of the present invention is that the particle size of the product can be controlled by the particular kind of liquid medium used, the mixing ratio of the liquid media and by the addition of other solvents or a non-solvent. For example, when a liquid medium which is not capable of dissolving the paint components is mixed with a liquid medium which is capable of dissolving the paint components in an amount of about 20 to 40 percent by weight to the latter liquid medium, the porosity of the resulting dry product increases and the bulk density of the dry product decreases.

In the powder paint of the present invention the particles of the powder are microporous and the dynamic bulk density of the present powder is ½ that of a powder obtained by other methods. More specifically, in the powder paint of the present invention the bulk density of the powder is about ½ that of a powder obtained by conventional grinding techniques. For example, the bulk density of the present powder having a size of 250 mesh is about 0.25 g/cm$^3$, and, on the contrary, that of a powder obtained by conventional grinding techniques is about 0.40 g/cm$^3$. Thus the rate of melting at the time of baking, which can be generally conducted at a temperature of about 160° to 180°C for about 20 to 30 minutes, is fast. Further, since the melting temperature range is narrow and the particle size is uniform, melt-hardening can be effected homogeneously, which results in the formation of a smooth surface. Heretofore smoothly coated surfaces were not obtained for porous surfaces, particularly surfaces containing components vaporized by heating when these surfaces were coated with prior art powder paints. However according to the present invention these materials can be coated and smoothly coated surfaces can be obtained due to the characteristics of the powder paint of the invention. That is to say, the powder paint of the present invention is in the form of a powder up to the temperature at which the coating begins to melt and melting of the coating is effected very rapidly because of the narrow melt-setting temperature range, during which time escape of air or volatile components from the porous surfaces is scarecely observed, and this results in the formation of smooth coatings.

Electrostatic coating is difficult with some powder paints of the present invention, particularly with those having strong coating strength and good resistance which lead to a high electrical resistance, however the electrical resistance can be reduced and a powder paint suitable for electrostatic coating can be obtained if a polar compound is added to the solvent. Therefore, an important characteristic of the powder paint of the present invention is that a clear coating which is resistant to abrasion and retains its clarity is formed on a glass surface by electrostatic coating. Further, the powder paint of the present invention has good storage qualities because particles of the paint do not adhere to each other during storage.

The mixing of the components of the paint in the method of the present invention can be carried out in a similar way with the production of a solution type paint, so it is possible to use conventional equipments and techniques to accomplish the mixing.

The liquid media used in the present invention can be used individually or as mixtures thereof. Suitable liquid media are those which are liquid at temperatures of from about normal temperature (i.e., about 20° to 30°C) to about 100°C and solidify on cooling. The liquid media generally have melting points ranging from about −30°C to 100°C and sublime in a vacuum below about 10 mmHg. Typical liquid media which can be used include benzene, dioxane, nitrobenzene, phenol, acetic acid, ethylene dibromide, tertiary butanol, cyclohexanol, aniline, camphor or mixtures thereof. Other solvents or non-solvents, such as acetone, methyl ethyl ketone, ethyl acetate, xylene, toluene, hexane and water, can be used in combination with these liquid media when specific components or type of coating is desired. In order to reduce the electrical resistance thereby facilitating electrostatic coating of the powder paint, polar compounds of the liquid media as described above, or other polar compounds such as methanol, ethanol, propanol, methyl ethyl ketone or methyl isopropyl ketone can be added to the liquid media.

After dissolving or dispersing the paint component, e.g., in an amount of 10 to 90 percent by weight as a solution or dispersion, the mixture is frozen, e.g., at a temperature of about −50°C to about +20°C and the frozen liquid media can be removed by sublimation in a vacuum below about 10 mmHg, preferably below 0.5 mmHg, particularly preferably 0.1 to 0.5 mmHg, generally at a temperature lower than about normal temperature in about 3 to 8 hours. The sublimed liquid media are recovered in a cooling trap. In addition, a method which comprises vacuum-drying simultaneously with freezing, a method which comprises rapidly freezing the solution or liquid dispersion, for example, with dry ice or liquid nitrogen, followed by vacuum-drying or a method which comprises spraying the solution or liquid dispersion in a freezing zone to freeze the mixture in the form of a fine powder and dried by vacuum can also be employed. If the dry product needs to be ground, the product can be ground conventionally, e.g., using an impact type grinder.

The components of the powder paint which can be produced according to the present invention are described in detail as follows. That is, substances capable of forming a polyurethane coating by reacting a polyester polyol or a polyether polyol with an isocyanate can be employed as suitable components. Suitable specific examples of components which can be present in a powder paint are an epoxy resin, an acrylic polyol, an acrylic resin, a polyvinyl chloride resin, cellulose acetate, cellulose acetate butyrate, a melamine resin, a nylon resin, a pigment, a dye, an extender, a levelling agent, a cross-linking agent, aluminum powder, copper powder, other metallic powders, a delustering agent, etc.

The present invention is illustrated in greater detail by reference to the following examples. In the examples, all parts, percents, and the like are by weight unless otherwise indicated.

EXAMPLE 1

23 parts of a block isocyanate (Crelan L/Ue 6107, tolylene diisocyanate blocked with ε-caprolactam, produced by Bayer Co., Ltd.) and 77 parts of a polyol (Crelan L/Ue 6108, a polyester polyol produced by reacting a dicarboxylic acid and a polyhydric alcohol, produced by Bayer Co., Ltd.) were dissolved in 230 parts of benzene, the resulting solution was placed in a freeze dryer, the temperature adjusted to −35°C to freeze the solution, and drying was conducted at 0.2 mmHg. When the temperature of the sample became identical with room temperature (about 20° to 30°C), the sample was removed. The dry product, which was a porous mass, was readily ground to fine powder using a conventional grinder. The ground product was sieved to obtain a powder paint of a 230 mesh size. This powder paint had good storage qualities. Application of this paint to a material to be painted followed by heating for 20 to 30 minutes at 180°C gave a smooth urethane resin coating. The surface of a foamed polyamide molding which was previously sprayed with a non-ionic surface active agent as an antistatic agent was electrostatically coated with this powder paint, followed by heat-setting, whereby a smooth coating was obtained.

EXAMPLE 2

The procedures of Example 1 were repeated with the exception that a mixture of 200 parts of dioxane and 30 parts of ethanol was used as the liquid medium to obtain a powder paint. This powder paint had an electrical resistance of $10^{10}\Omega cm$. This paint was applied to the surface of a glass bottle which had been previously treated with a non-ionic surface active agent as an antistatic agent, and at that time an uniform coating was effected. The coating was heated for 30 minutes at 180°C, thereby giving a smooth, transparent and tough coating which was resistant to abrasion and retained its clarity even after washing.

EXAMPLE 3

35 parts of a polyol (Crelan L/Ue 6108) was dissolved in 240 parts of benzene. To this solution was added 30 parts of titanium white to obtain a dispersion paste. Then, 40 parts of this polyol and 25 parts of a block isocyanate (Crelan L/Ue 6107) were added to the dispersion paste. The mixture was mixed well and in a similar manner as described in Example 1 freeze-dried, ground and sieved to obtain a white powder urethane paint. In place of titanium white, phthalocyanine, carbon black, quinacridone and the like were used to obtain various colored powder urethane paints.

EXAMPLE 4

The procedures of Example 3 were repeated except that 15 parts of an aluminium paste was used in place of titanium white to obtain a silver powder urethane paint having an excellent luster.

EXAMPLE 5

23.2 parts of an epoxy resin (Epicoat 1004, the polymerization product of bisphenol A and an epoxy ring-containing compound, produced by Shell Chemical Co., Ltd.) was dissolved in 70 parts of dioxane and to this solution were added 1.02 parts of dicyanodiamine, 4.65 parts of titanium white and 1.13 parts of a silicone oil as a levelling agent, and the mixture was mixed well. The mixture was freeze-dried, ground and sieved in a similar manner as described in Example 1 to obtain a white powder epoxy paint.

EXAMPLE 6

40 parts of an acrylpolyol (Crelan L/Ue A 101, the polymerization product of styrene and acrylic acid, produced by Bayer Co., Ltd.) was dissolved in 240 parts of dioxane and into this was dispersed 30 parts of titanium white to obtain a paste. An additional 45 parts of this acrylpolyol and 15 parts of a crosslinking agent oxazoline (Crelan A-D, bisoxazoline, produced by Bayer Co., Ltd.) were added to this paste and, the mixture, after mixing well, was cooled to −30°C to freeze the mixture. The liquid medium was removed by sublimation in a vacuum of 0.5 mmHg, and the resulting product was ground and sieved to obtain a powder paint having a particle size of 20 to 50 $\mu$. This paint was applied to the surface of a foamed polyamide molding, and heat-set to obtain a smooth coating.

EXAMPLE 7

85 parts of the acrylpolyol and 15 parts of the crosslinking agent oxazoline, as used in Example 6 were dissolved in a mixture of 200 parts of dioxane and 30 parts of methanol. The solution was freeze-dried, ground and sieved in a similar way as described in Example 6 to obtain a powder paint having a particle size of 20 to 70 $\mu$. This powder paint had an electrical resistance of $10^{10}\Omega cm$. This paint was electrostatically coated on a glass bottle and heated for 30 minutes at 170°C to obtain a smooth and clear coating.

EXAMPLE 8

30 parts of a thermoplastic acrylic resin (Paraloid B-66, an acrylic ester copolymer produced by Rohm and Hass Co., Ltd.) was dissolved in 70 parts of benzene, and the resulting solution was cooled to −35°C to freeze and the mixture dried in a vacuum of 0.2 mmHg. The resulting product was ground with a conventional impact grinder. Grinding was accomplished very smoothly. After sieving 20 parts of a powder paint having a particle size of 20 to 50 $\mu$ was obtained. This powder paint had good storage qualities and no change in particle size was observed on storage for 6 months at 50°C. This powder paint was coated and heated for 20 minutes at 160°C to obtain an uniform acrylic resin coating.

EXAMPLE 9

70 parts of a thermoplastic vinyl chloride resin (Vinilite VYHH, polyvinyl chloride containing 13 percent by weight vinyl acetate, produced by Union Carbide Co., Ltd.) was dissolved in 70 parts of dioxane, and into this solution was dispersed 15 parts of rutile type titanium white, and further 50 parts of dioxane was added to reduce the viscosity. The product thus obtained was freeze-dried and ground in a similar manner as described in Example 8 to obtain 25 parts of a powder paint having a particle size of 20 to 50 $\mu$. Use of phthalocyanine blue in place of titanium white provided a colored powder paint, and use of an aluminium paste gave a powder paint which forms a coating of good luster.

While the invention has been described in detail and with reference to specific embodiments thereof, it will be apparent to one skilled in the art that various changes and modifications can be made therein without departing from the spirit and scope thereof.

What is claimed is:

1. A method for producing a powder paint which comprises dissolving a resin paint component in a liquid medium, freezing the resulting solution, and removing the liquid medium by sublimation.

2. The method according to claim 1, wherein said liquid medium melts at temperature ranging from about −30°C to 100°C and sublimes under a pressure lower than about 10 mmHg.

3. The method according to claim 1, wherein said liquid medium contains a polar compound.

4. The method according to claim 1, wherein freezing is conducted at temperature lower than about −20°C and the liquid medium is removed by subliming under a pressure of 0.1 to 0.5 mmHg.

5. The method according to claim 1, wherein said paint components contain components which tend to react or deteriorate by heating or due to friction.

6. The method according to claim 1, wherein said freezing and removing of the liquid medium is by freeze-drying.

7. The method according to claim 1, further comprising dispersing other paint components in the liquid medium prior to freezing.

* * * * *